No. 754,788. Patented March 15, 1904.

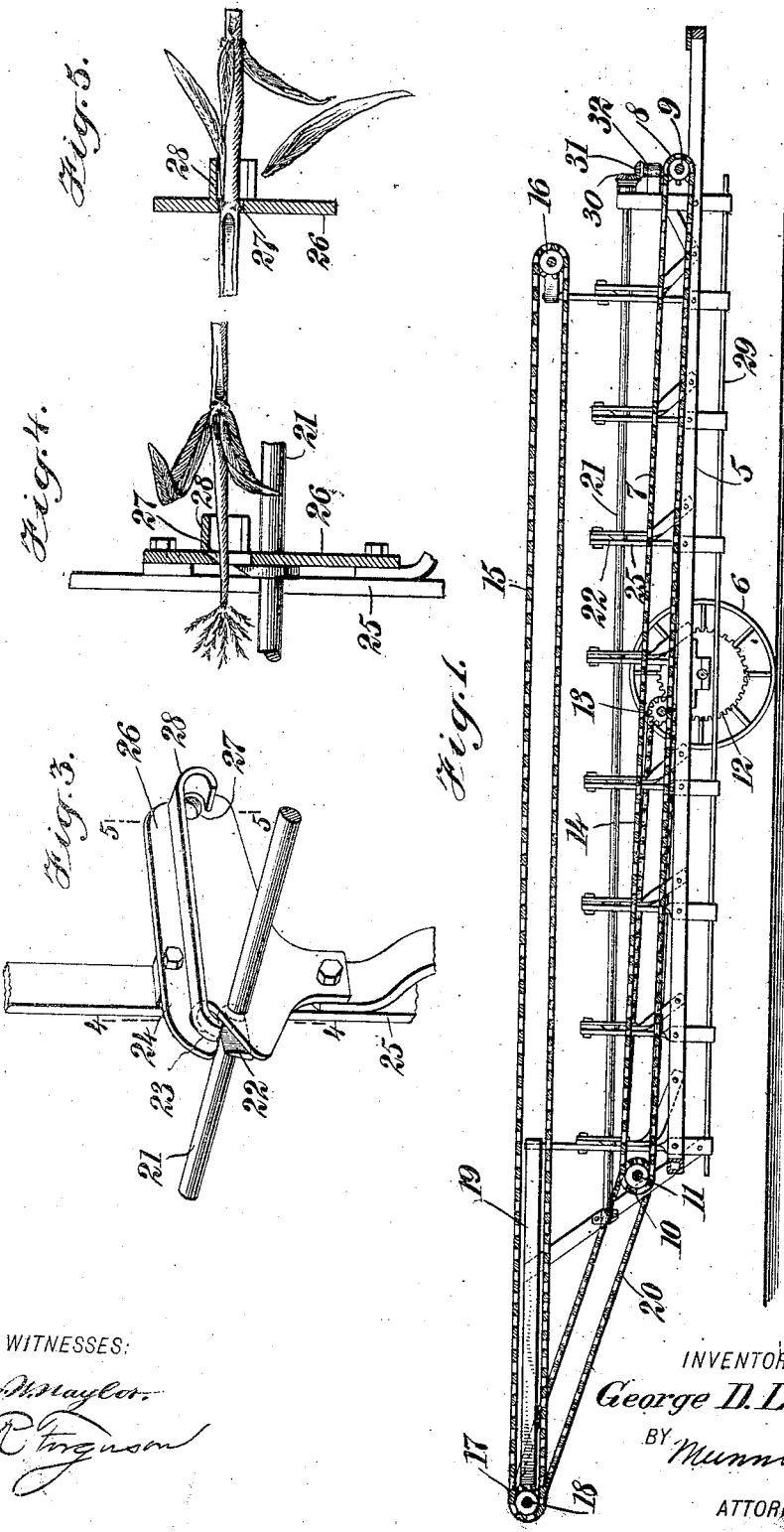

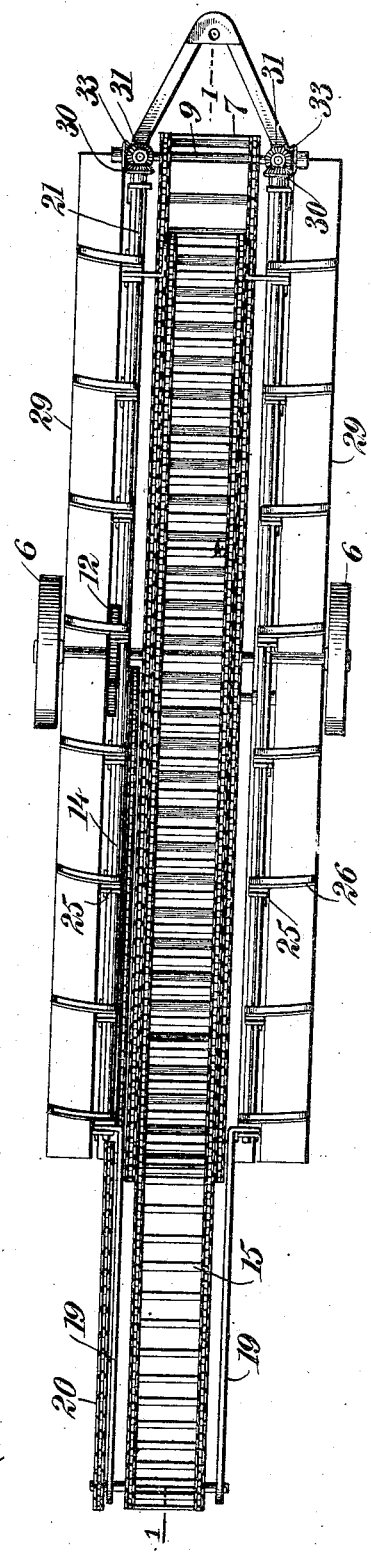

UNITED STATES PATENT OFFICE.

GEORGE D. LUCE, OF NEW ORLEANS, LOUISIANA.

TOPPER AND STRIPPER FOR CANE-HARVESTERS.

SPECIFICATION forming part of Letters Patent No. 754,788, dated March 15, 1904.

Application filed July 27, 1903. Serial No. 167,101. (No model.)

*To all whom it may concern:*

Be it known that I, GEORGE D. LUCE, a citizen of the United States, and a resident of New Orleans, in the parish of Orleans and State of Louisiana, have invented a new and Improved Topper and Stripper for Cane-Havesters, of which the following is a full, clear, and exact description.

This invention relates to improvements in topping and stripping mechanism designed to be used in connection with a sugar-cane harvester, an object being to provide a mechanism of this character by means of which the cane may be quickly topped and stripped of its leaves and the stalk conveyed to a cart or wagon.

I will describe a topper and stripper for cane-harvesters embodying my invention and then point out the novel features in the appended claims.

Reference is to be had to the accompanying drawings, forming a part of this specification, in which similar characters of reference indicated corresponding parts in all the figures.

Figure 1 is a longitudinal section on the line 1 1 of Fig. 2 of a topper and stripper embodying my invention. Fig. 2 is a plan view thereof. Fig. 3 is a perspective view showing one of the topping and stripping devices. Fig. 4 is a section on the line 4 4 of Fig. 3, and Fig. 5 is a section on the line 5 5 of Fig. 3.

The topping and stripping device is designed to be drawn as a trailer by a cane cutter or harvester. It comprises a frame 5, supported at about the center on wheels 6, and extending longitudinally of the frame is an endless carrier 7, the chains of which pass around sprocket-wheels 8 on a front shaft 9 and thence around sprocket-wheels 10 on a rear shaft 11. Motion is imparted to this endless carrier from the axle of the wheels 6. As here shown, a gear-wheel 12 is attached to the axle and meshes with a pinion 13, on the shaft of which is a sprocket-wheel, from which a chain 14 extends to a connection with a sprocket-wheel on the shaft 11, and arranged above the carrier 7 is another endless carrier 15, which extends around rollers 16 near the front end of the frame and thence around sprocket-wheels 17, attached to a shaft 18, having bearings in arms 19, extended from the standards at the rear end of the frame 5. It will be noted that these arms 19 extend considerably rearward of the frame, so that a cart or other vehicle may be drawn underneath the same to receive the material discharged from the carrier. This carrier 15 is operated by a chain 20, driven from the shaft 11 and connecting with the sprocket-wheel on the shaft 18.

Arranged at each side of the machine and extended longitudinally thereof is a topping-shaft 21, and each shaft 21 carries a plurality of topping-blades 22, which coact with hook-like blades 23, formed in a plate 24 and attached to uprights 25 in the sides of the frame. Each plate 24 has an outward extension forming a stripping-plate 26, having a hole 27, into which the cane is to be thrust to remove the leaves that may be thereon, and extended partly around the hole 27 is a guide-plate 28. By extending the plates 26 outward or laterally from the sides of the frame the stripping-holes are more conveniently placed for the manipulation of the cane by persons standing on the running-boards 29 than would be the case were the plates having the holes extended directly upward from or over the frame.

In the operation as the cut cane passes from the harvester the operator standing on the running-boards 29 will pick up the cane singly and hold the upper ends thereof in position for the operation of the topping-blades 22 23. After this the stalk of cane is to be thrust into the hole 27 far enough to strip off the leaves and then withdrawn. Then the topped and stripped cane is placed upon the feeder or carrier 15, which carries the same to the cart at the rear end.

Motion is imparted to the shafts 21 from the movements of the carrier 7. The forward end of each shaft 21 is provided with a bevel-pinion 30, engaging a bevel-pinion 31 on a vertical shaft 32, on the lower end of which is a bevel-pinion engaging with a bevel-pinion 33 on the shaft 9.

Having thus described my invention, I claim as new and desire to secure by Letters Patent—

1. A trailer for a harvesting-machine comprising a wheel-mounted frame, an endless carrier in said frame, shafts extended along the opposite sides of said frame, topping-blades carried by said shafts, fixed blades coacting with the first-named blades, and uprights supporting the fixed blades, and plates extended outward from said uprights and provided with stripping-holes.

2. A trailer for a harvesting-machine, comprising a frame mounted on wheels, an endless conveyer or carrier, uprights at the sides of said frame, cutter-plates on said uprights, shafts extended along said uprights, cutters carried by said shafts and coacting with the cutter-plates, arms extended upward from said uprights and provided with stripping-holes, and guard-plates extending partly around the holes.

3. A trailer for a cane-harvester, comprising a wheel-mounted frame, an endless carrier extended along said frame, shafts extended along the sides of the frame, guiding connections between said shafts and the endless carrier, driving connections between said endless carrier and the wheels of the trailer, topping-blades on said shafts, and an endless carrier above the first-named carrier and extended rearward thereof.

4. A trailer for a cane-harvester, comprising a wheel-mounted frame, carriers on said frame, platforms arranged along the sides of the frame, and stripping devices comprising plates extended laterally from the frame over the platforms and provided with holes and guides extending partly around the holes.

5. A trailer for a cane-harvester, endless carriers, a wheeled frame supporting said carriers, uprights at the sides of the carriers, rotary topping-blades, fixed blades on the uprights, and stripping devices supported by the uprights and extended outward therefrom.

In testimony whereof I have signed my name to this specification in the presence of two subscribing witnesses.

GEORGE D. LUCE.

Witnesses:
C. M. HERO,
ANDREW HERO.